United States Patent [19]

Uchiyama

[11] Patent Number: 5,767,601

[45] Date of Patent: Jun. 16, 1998

[54] PERMANENT MAGNET ELECTRIC GENERATOR

[75] Inventor: Hidekazu Uchiyama, Miyagimura, Japan

[73] Assignee: Mitsuba Corporation, Gunma, Japan

[21] Appl. No.: 766,726

[22] Filed: Dec. 13, 1996

[30] Foreign Application Priority Data

Dec. 19, 1995 [JP] Japan .................... 7-348760

[51] Int. Cl.$^6$ .................... H02K 1/27

[52] U.S. Cl. .................... 310/190; 310/190; 310/67 R; 310/181; 310/191; 310/198; 310/156; 310/209

[58] Field of Search .................... 310/113, 156, 310/209, 181, 67 R, 198, 190, 191, 153

[56] References Cited

U.S. PATENT DOCUMENTS 3,411,027  11/1968  Rosenberg .................... 310/181

Primary Examiner—Steven L. Stephan
Assistant Examiner—Karl E.I. Tamai
Attorney, Agent, or Firm—McCormick, Paulding & Huber

[57] ABSTRACT

A permanent magnet electric generator has a raised output as compared with the output of a similar conventional permanent magnet generator in which the polar arcuate angle of the permanent magnets is equal to the polar arcuate angle of controlling magnetic poles. Electricity is generated in armature coils 16 by the rotation of permanent magnets 8 of a rotor 4. Controlling magnetic poles 9 formed of a magnetic material are interposed between the permanent magnets 8 of the rotor 4, and a field controlling coil 17 is provided on a stator 11. The value of the polar arcuate angle $\theta$ m of the permanent magnets 8 divided by the sum of the polar arcuate angle $\theta$ m of the permanent magnets 8 plus the polar arcuate angle $\theta$ p of the controlling magnetic poles 9 is set at 0.55 to 0.7. The generator provides an increased output as compared with a permanent magnet generator having the same physique as that of a generator in which all field magnetic poles of the rotor 4 are constituted by permanent magnets and wherein the polar arcuate angle $\theta$ m of the permanent magnets 8 is equal to the polar arcuate angle $\theta$ p of the controlling magnetic poles 9.

6 Claims, 5 Drawing Sheets

PERMANENT MAGNET ELECTRIC GENERATOR

BACKGROUND OF THE INVENTION

1. Field of the Invention

This invention relates to a permanent magnet electric generator and more particularly to a technique effective in use of such a generator linked with an engine of a light motor vehicle such as a motorcycle or with a general purpose engine.

2. Statement of the Related Art

In general, when a generator is linked with an engine of a light motor vehicle such as a motorcycle, the desired output can be obtained from a simplified generator, so that permanent magnet generators have been widely used.

The conventional magnetic generator of this type includes a stator wound therearound with armature coils and a rotor, in which permanent magnets are concentrically arranged at intervals in the circumferential direction on a yoke formed of a magnetic material, which the yoke is rotatably supported at the outside of the stator, whereby, due to the rotation of the permanent magnets of the rotor, electricity is induced in the armature coils.

Now, in a generator having a field coil, such as an alternator which is mounted on a four wheel motor car, field current passing through the field coil is controlled, so that output voltage can be maintained at a predetermined value against fluctuations in the number of rotations and the load. In contrast thereto, in a permanent magnet generator, a field system is formed of the permanent magnets, so that it is impossible to control the field system. Then, in a permanent magnet generator, such a practice is performed that a voltage regulator is provided at the side of output to short-circuit the armature coils, whereby the voltage is maintained at a predetermined value.

However, in a conventional permanent magnet generator, when a generator having a capacity meeting the highest output value required from the side of the light motor car is mounted on the light motor car, electricity is generated at the highest capacity of the generator, whereby the surplus electric power out of the highest electric power is short-circuited and controlled by the voltage regulator and abandoned as heat, whereby the electric generating efficiency is lowered, with the result that such a problem as the output loss of the engine and the decrease of the fuel consumption rate is presented.

In Japanese Patent Laid-Open No. 59314/1995, a permanent magnet generator is proposed such that controlling magnetic poles formed of magnetic materials are provided in the rotor between the permanent magnets, and a field controlling coil is arranged in a space formed between the stator and a bottom portion of the yoke such that fluxes generated by current passing through the field controlling coil form closed magnetic circuits passing through the yoke of the rotor and the controlling magnetic poles. In this generator, the direction and magnitude of current passing through the field controlling coil are controlled, whereby the field magnetic power is made suitable, so that the electricity generating power can be adjusted. That is, different conditions between the magnetic generator requiring strong fluxes and the magnetic generator requiring only weak fluxes can be desirably met by controlling the increase and decrease of the magnetic power due to the current passing through the field controlling coil.

However, in the above-described permanent magnet generator, only controlling magnetic poles having the same polar arcuate angle as the permanent magnets are provided, and a problem is presented in that this arrangement is somewhat lower in output than an arrangement in which all of the field poles are constituted by the permanent magnets, on the basis of a comparison made between arrangements having physiques equal to each other. Thus, the development of a permanent magnet generator capable of adjusting outputs and which can obtain an equal output in the same physique as one in which all of the field poles are constituted by the permanent magnets, has been desired.

SUMMARY OF THE INVENTION

It is an object of the present invention to provide a permanent magnet generator capable of adjusting outputs and which can obtain an equal output in the same physique as one in which all of the field poles of the rotor are constituted by the permanent magnets.

The permanent magnet generator according to the present invention is characterized in that a polar arcuate angle $\theta$ m of the permanent magnets is set at a value different from a polar arcuate angle $\theta$ p of the controlling magnetic pole which are arranged alternately with the permanent magnets. In this case, the rate of the polar arcuate angle $\theta$ m of the permanent magnet to the sum of the polar arcuate angles of the both polar arcuate angles can be set at $0.55 \leq \theta\,m/(\theta\,m + \theta\,p) \leq 0.7$.

In the above-described means, in considering the balance between the charge and the discharge of a battery, since the polar arcuate angle $\theta$ m of the permanent magnet is set, as the lower limit, to a point at which an output of the generator during the idling rotation of an engine is higher than an equiangular case (an angle, at which the polar arcuate angle $\theta$ m of the permanent magnet and the polar arcuate angle $\theta$ p of the controlling magnetic pole are equal to each other) by 20%, and it is set, as the upper limit, to a point, at which the output equal to the output of a generator during the rating output of the engine in this setting can be obtained during the rating output of the engine, whereby the generating output can be increased in comparison to the case where the polar arcuate angle $\theta$ m of the permanent magnet is equal to the polar arcuate angle $\theta$ p of the controlling magnetic pole.

The above-described and other objects, and novel feature of the present invention will become apparent more fully from the description of the following specification in conjunction with the accompanying drawings.

DESCRIPTION OF THE PREFERRED EMBODIMENT

Figure 1A:
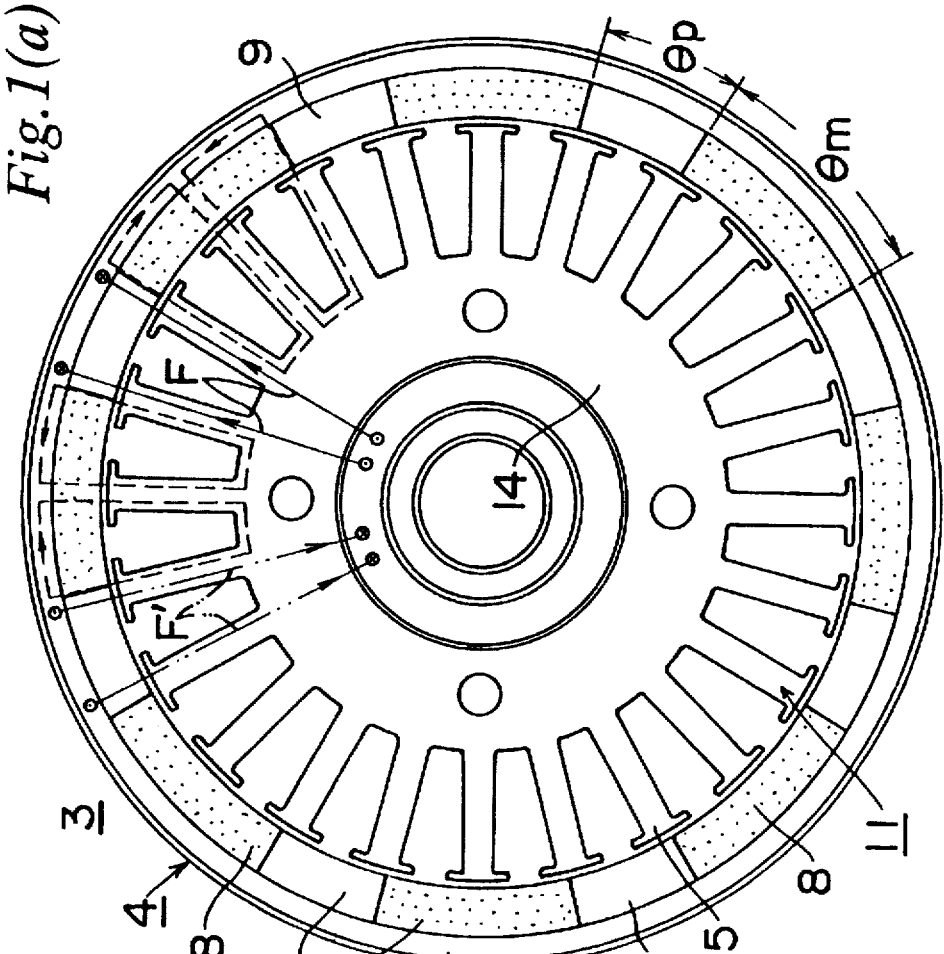
FIG. 1 shows a permanent magnet generator as being an embodiment of the present invention, FIG. 1(a) being a partially omitted front view and FIG. 1(b) being a side sectional view.
Figure 1B:
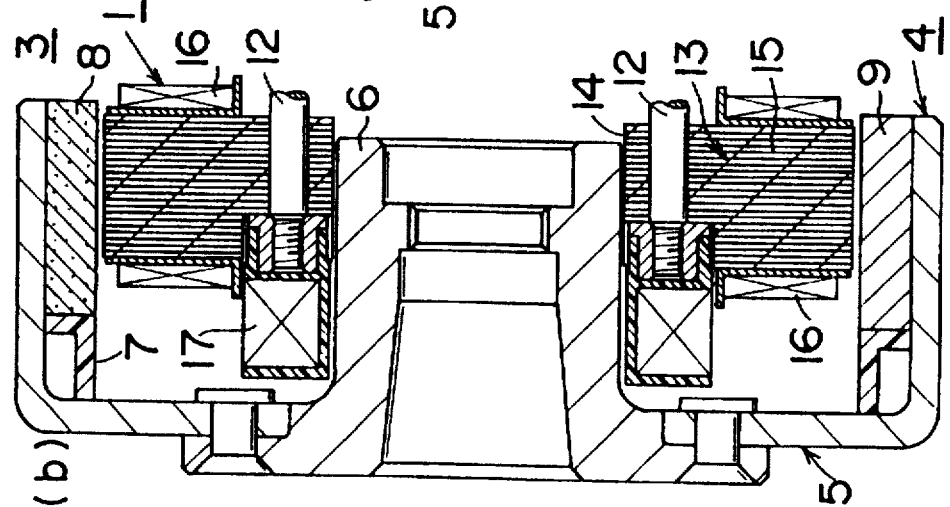

In this embodiment, a permanent magnet generator according to the present invention is constructed so as to be suitable for mounting on a light motor vehicle such as a motorcycle. This generator 3 includes a stator disposed on an engine case, not shown, of an engine and fixed thereto, and a rotor connected to a crankshaft, not shown, of the engine. Thus, the generator is constructed so as to be driven by the engine through a crankshaft to generate electricity.

A rotor 4 of this generator 3 is constructed so as to serve both as a field element of the generator and a flywheel of the engine. The rotor 4 includes a yoke 5 formed of a magnetic material such as iron to provide a bottomed short cylindrical shape and a cylindrical boss member 6 disposed concentrically on the inner surface of a bottom wall of this yoke 5 and integrally raisedly provided. The boss member 6 is taper-jointed to the crankshaft and fastened to each other through fastening means, not shown, such as bolts, whereby the rotor 4 is fixed to the crankshaft so as to be rotated integrally.

A support ring 7 formed of a non-magnetic material such as resin is coupled into the inner periphery of a bottom portion of the yoke 5 and fixed thereto. A plurality of permanent magnets 8 for constituting field poles and a plurality of controlling magnetic poles 9 being equal in number to the permanent magnets 8 and formed of a magnetic material such as iron (material having a high magnetic permeability) are arranged alternately in the circumferential direction and fixed thereto. These permanent magnets 8 and controlling magnetic poles 9 are formed to provide circularly arcuate rectangular parallelopiped shapes respectively having the polar arcuate angles θ m and θ p, which are different from each other, and the polar arcuate angle θ m of the permanent magnet 8 and the polar arcuate angle θ p of the controlling magnetic pole 9 are respectively set to satisfy the predetermined values, which will hereunder be described. Furthermore, the adjoining permanent magnets 8 and 8 are provided at the same poles and the counter poles are formed by the controlling magnetic poles 9, which are arranged between the permanent magnets 8.

A stator 11 as being an armature of this generator 3 includes a core 13 formed of a magnetic material such as iron to provide a substantially star-shaped short disk shape. The core 13 is disposed concentrically with the crankshaft on the outer surface of the engine case and abutted against the outer surface, and fixed and fastened thereto through bolts 12 as being fastening means. Then, the rotor 4 is disposed to surround the outer periphery of the stator 11 fixed to the engine case, and the rotor 4 is rotated around the stator 11 by being driven by the crankshaft.

The core 13 is integrally formed such that a multitude of thin plates formed of a magnetic material such as iron are laminated, and includes a main body 14 formed to provide a dough-nut shape. A plurality of salient poles 15 are radially projectingly provided on the outer periphery of the main body 14 of core. Armature coils 16 are wound around the respective salient poles 15 in three phase by delta connection winding or star connection winding, respectively, and each of these armature coils 16 is connected to a battery and a load, both not shown, through a rectifier and a voltage regulator. Incidentally, in FIG. 1(a), the armature coil 16 is not shown for convenience's sake.

A cylindrical field controlling coil 17 for controlling the field fluxes is formed on an end face of the main body 14 of core on the opposite side to the engine case, and disposed concentrically and fixed through bolts 12. The method of winding the field controlling coil 17 is made to form a circle concentric with the stator 11 and the rotor 4. Accordingly, most of fluxes F of the field controlling coil 17 form closed magnetic circuits passing through the main body 14 of the core 13, the salient poles 15 opposed to the controlling magnetic poles 9, the controlling magnetic poles 9 of the rotor 4, the yoke 5, the boss member 6 and the core 13, respectively.

Detailed description will hereunder be given of setting of the polar arcuate angle θ m of the permanent magnet 8 and of the polar arcuate angle θ p of the controlling magnetic pole 9.

When various studies have been made for increasing the output of permanent magnet generators having controlling magnetic poles and being capable of adjusting the output by a field controlling coil in a physique equal in level to a permanent magnet generator in which the field poles are formed only by permanent magnets, the inventor of the present invention has found that there are the following relationship among the polar arcuate angle θ m of the permanent magnet 8, the polar arcuate angle θ p of the controlling magnetic pole 9 and the output. The present invention has been created on the basis of this founding.

Figure 2:
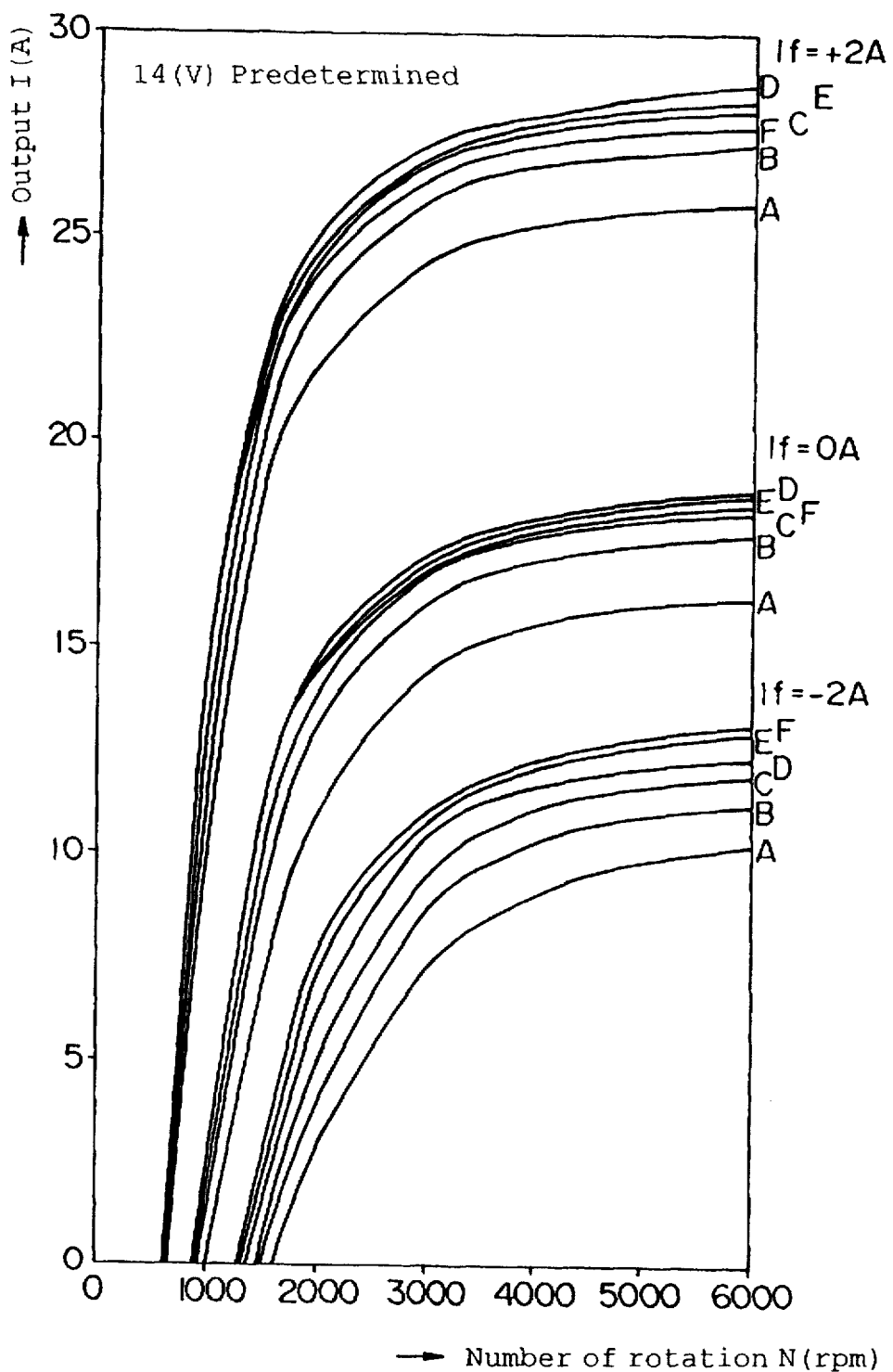
FIG. 2 is a view showing output characteristic lines of respective polar arcuate angles for seeking the optimal value.

When the relationship between the number of rotation N (rpm) of the generator 3 and the output current I (A) was measured while the ratio between the polar arcuate angle θ m of the permanent 8 and the polar arcuate angle θ p of the controlling magnetic pole 9 was changed variously, respective output characteristics lines as shown in FIG. 2 were obtained. Here, the respective output characteristic curves show those obtained when direct current is passed to the field controlling coil 17 while the generator 3 is held at a predetermined voltage of 14 V after the generator 3 is subjected to a warming-up operation for 5 min.. In FIG. 2, a characteristic curve A shows a case where "The polar arcuate angle θ m of the permanent magnet 8: the polar arcuate angle θ p of the controlling magnetic pole 9=50:50", the characteristics curve B shows "θ m:θ p=53:47", the characteristics curve C shows "θ m:θ p=58:42", the characteristics curve D shows "θ m:θ p=62:38", the characteristics curve E shows "θ m:θ p=67:33", and the characteristics curve F shows "θ m:θ p=71:29".

In FIG. 2, it is understood that if the current passed to the field controlling coil 17 is If, the output current is higher when the current If=0A than when the current If=−2A, and further, the output current is higher when If=+2A than when If=0A. Here, as for the positive or negative sign of the current If, a direction, in which the effective fluxes of the generator are increased, i.e., a direction, in which a pole different from the permanent magnet 8 is generated in the controlling magnetic pole 9, is plus.

Furthermore, it is understood that, as for any value of the current If, over the regions from the low number of rotation to the high number of rotation, the characteristic curves other than the characteristic curves A, particularly the characteristics curves C, D, E and F show higher values. That is, it has been found that, in order to obtain a higher output current, it is better to set the polar arcuate angle θ m of the permanent magnet 8 to be larger than the polar arcuate angle θ p of the controlling magnetic pole 9 rather than setting the polar arcuate angle θ m of the permanent magnet 8 to be equal to the polar arcuate angle θ p of the controlling magnetic pole 9.

Figure 3A:
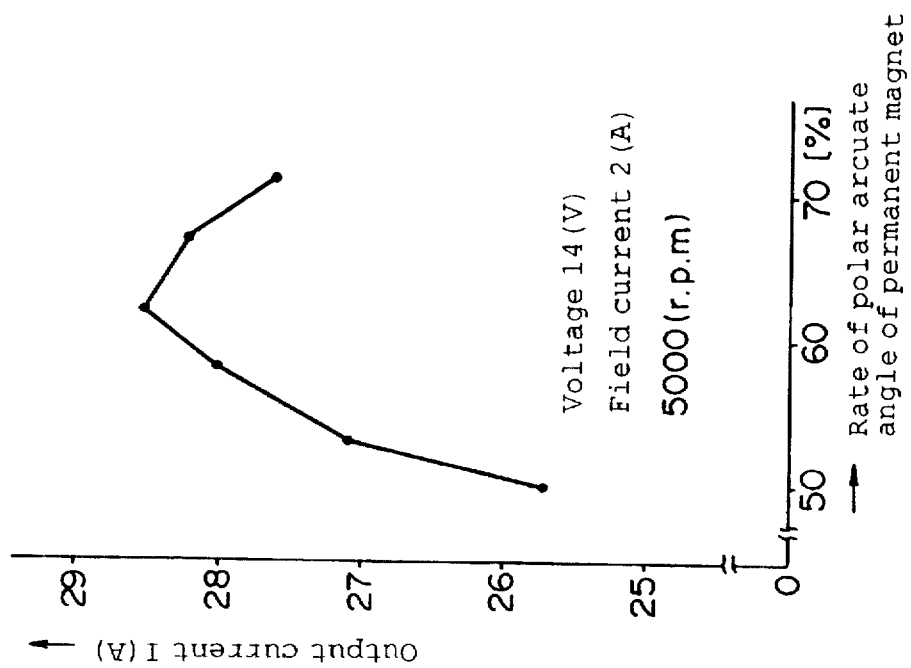
FIG. 3 is also a characteristic lines view showing the relationship between the polar arcuate angle and the output, FIG. 3(a) being a characteristic lines view during the idling and FIG. 3(b) being a characteristic lines view at the time of the rating output.
Figure 3B:
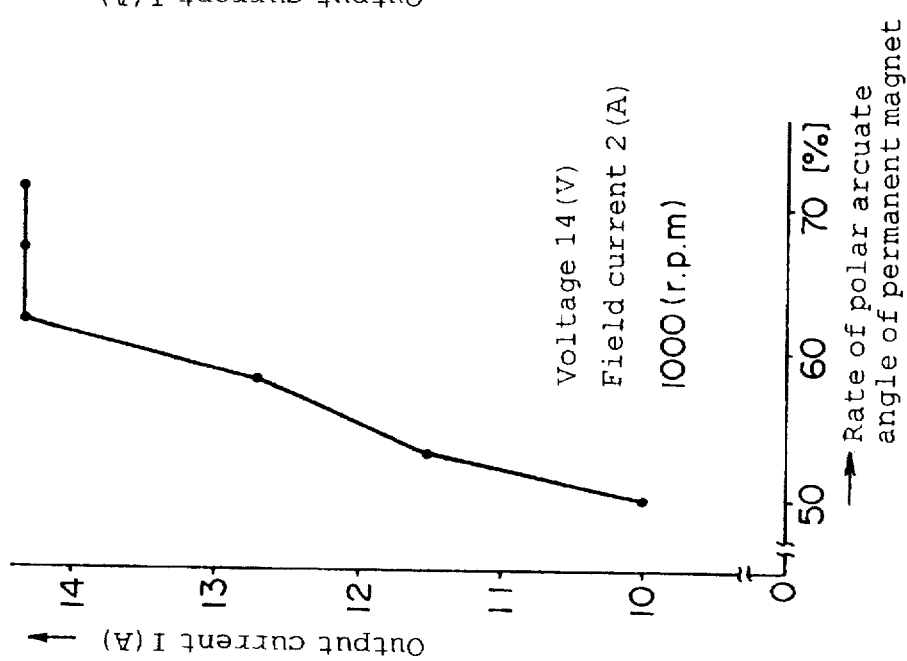

Then, when the relationship between the polar arcuate angle and the output was studied, the characteristic curves shown in FIG. 3(a) and 3(b) were obtained.

In FIG. 3(a), it is understood that, when the magnetic generator 3 is operated at an idling state (about 1000 rpm), as the rate of the polar arcuate angle θ m of the permanent magnet 8 is increased, the output current is increased, and, from the time the polar arcuate angle θ m exceed 60%, the output current is saturated. Incidentally the current If is 2A and the voltage is 14 V.

Furthermore, in FIG. 3(b), it is understood that, when the magnetic generator 3 is operated at the rating (5000 rpm), as the rate of the polar arcuate angle θ m of the permanent magnet 8 is increased, the output current is increased, the polar arcuate angle θ m reaches the peak about at 62%, and, as the polar arcuate angle θ m is increased still more, the output current is decreased this time.

Figure 4:
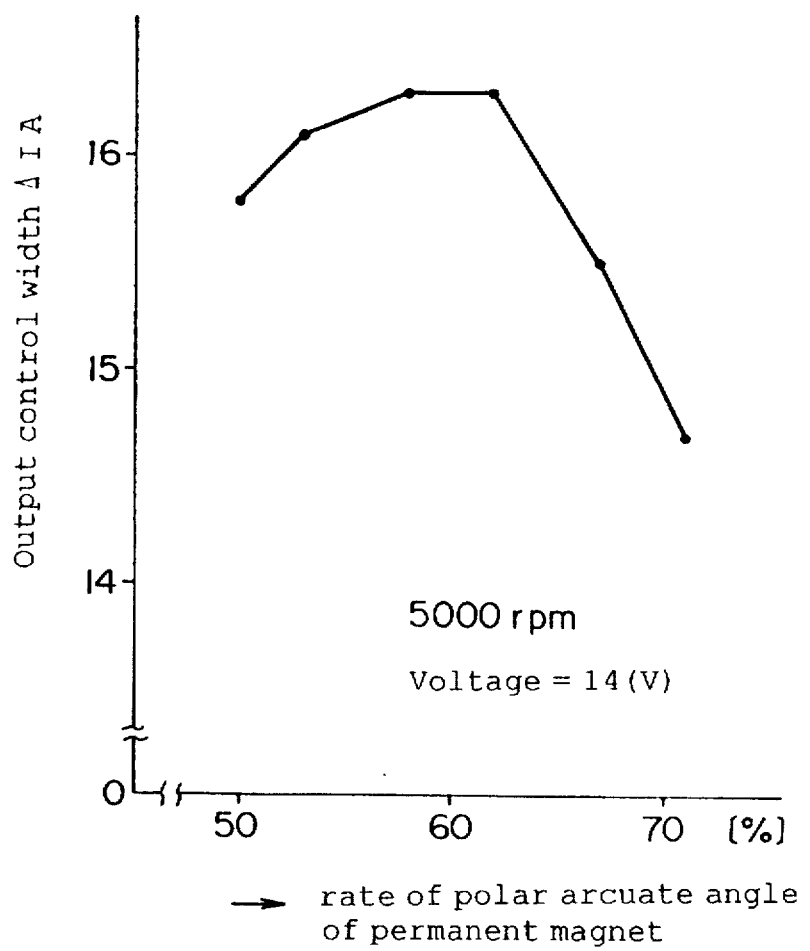
FIG. 4 is also a characteristic lines view showing the relationship between the polar arcuate angles and the output controlling width.

Next, when the output control width during an output of the rating (5000 rpm), i.e., differences between the highest output and the lowest output were measured at every polar arcuate angle θ m, a characteristics curve as shown in FIG. 4 was obtained.

In FIG. 4, if the polar arcuate angle θ m of the permanent magnet 8 is evaluated from the standpoints of the highest output and the output control width, it is found that the optimal value of the polar arcuate angle θ m is about 60%.

Figure 5:
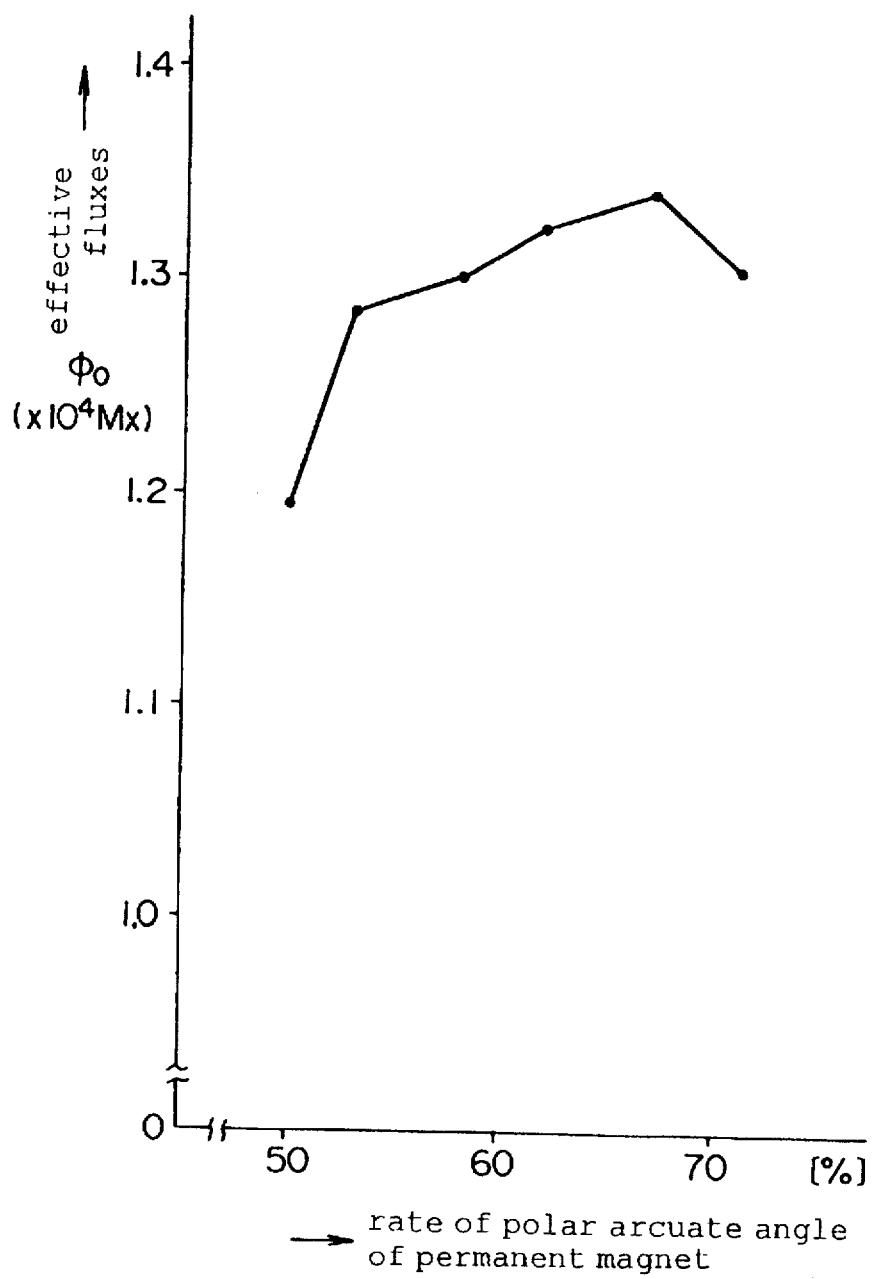
FIG. 5 is also a characteristic lines view showing the static effective magnetic fluxes when the polar arcuate angle is changed.

Next, when the static effective fluxes at the time the polar arcuate angle θ m of the permanent magnet 8 was changed, the results of measuring shown in FIG. 5 was obtained.

In FIG. 5, it is found that the value of the effective magnetic fluxes has its peak during the time the value of the polar arcuate angle θ m of the permanent magnet 8 is between 60 and 70%. The reason seems to reside in that, when the permanent magnet 8 and the controlling magnetic pole 9 are made to be adjoined, the end portion of the permanent magnet 8 is magnetically short-circuited by the controlling magnetic pole 9, whereby the magnitude of the permanent magnet becomes substantially small. In short, if the value of the polar arcuate angle θ m of the permanent magnet 8 is set to be larger than the polar arcuate angle θ p of the controlling magnetic pole 9 while expecting the aforesaid difference due to the magnetic short-circuit, then the rate of contribution to the effective fluxes of the permanent magnets 8 becomes high.

Further, since the controlling magnetic pole 9 has a higher saturated magnetic flux density than the permanent magnet, the controlling magnetic pole 9 can do with a small area of magnetic pole, i.e., a polar arcuate angle relative to the permanent magnet 8. In contrast thereto, in order to increase the quantities of fluxes, the permanent magnet 8 should enlarge the area of magnetic pole. It has been studied that, for these reasons, the balance of the field magnetic force (the balance of the magnetic fluxes from the permanent magnets 8 and the magnetic fluxes from the field controlling coil 17) is bettered by making the polar arcuate angle θ m of the permanent magnet 8 larger than the polar arcuate angle θ p of the controlling magnetic pole 9, with the result that a high output can be obtained.

From the experimental results shown in FIGS. 2 to 5, in the present invention, the rate between the polar arcuate angle θ m of the permanent magnet 8 and the polar arcuate angle θ p of the controlling magnetic pole 9 is set in consideration of the following points.

Firstly, when the balance between the charge and discharge of a battery is considered (conditions of easily discharging), if the lower limit is set at a point, at which the output during the idling (1000 rpm) exceeds the equiangle (θ m=θ p) by 20%, then the polar arcuate angle θ m becomes 55%.

On the other hand, if the upper limit is set at a point, at which the output during the rating (5000 rpm) (substantially, the highest output of the magnetic generator 3) becomes the output equal to the one when the polar arcuate angle θ m is 55%, then the polar arcuate angle θ m becomes 70%.

In short, it is desirable that the polar arcuate angle θ m of the permanent magnet 8 and the polar arcuate angle θ p of the controlling magnetic pole 9 are so set as to satisfy the following formula (1).

$$0.55 \leq \theta\ m/(\theta\ m+\theta\ p) \leq 0.7 \ldots \quad (1)$$

Next, the action will hereunder be described.

When the crankshaft is rotated by the engine, the rotor 4 is rotated. Then, along with the rotation of the rotor 4, the electromotive force is generated in the armature coils 16, and this electromotive force is supplied to the battery and the load as the generating power. Here, when the field controlling coil 17 is not electrically connected to the battery, the magnetic fluxes by the field controlling coil 17 do not act on the field system, whereby the quantities of the magnetic fluxes in the rotor 4 are brought into a state of depending on the quantities of magnetic fluxes of the permanent magnets 8.

Next, when the current is passed to the field controlling coil 17 such that the controlling magnetic pole 9 becomes heteropolar from the permanent magnet 8, as described above, most of the magnetic fluxes F by the field controlling coil 17 form the closed magnetic circuits passing through the controlling magnetic poles 9. Accordingly, the magnetic fluxes interlinking the armature coils 16 are formed such that the magnetic fluxes F by the field controlling coil 17 is superposed on the magnetic fluxes by the permanent magnets 8, and changes in the magnetic fluxes are increased by the quantities of the magnetic fluxes which are increased in accordance with the current passed to the field controlling coil 17, whereby the generating current generated in the armature coils 16 is increased.

On the other hand, when the current is passed to the field controlling coil 17 such that the controlling magnetic pole 9 becomes homopolar with the permanent magnet 8 (in a direction opposite to the above), the magnetic fluxes by the permanent magnets 8 and the magnetic fluxes F by the field controlling coil 17 interlock the armature coils 16 differentially, whereby changes in the magnetic fluxes are decreased by the quantities of the magnetic fluxes which are decreased in accordance with the current passed to the field controlling coil 17, so that the generating current generated in the armature coils 16 is decreased.

Thus, the output of the permanent magnet generator 3 can be adjusted by increasing or decreasing it in accordance with the direction and the magnitude of the current passed to the field controlling coil 17. According to the technique of adjusting by increasing or decreasing this output, since it can be dispensed with that the generator 3 is set to meet the highest power required as in the prior art, abandonment of the surplus electric power out of the highest electric power by the voltage regulator as heat can be precluded or controlled. As a result, the power generating efficiency of a permanent magnet generator can be raised, the power of the engine can be raised accordingly, and, in its turn, the fuel consumption rate of the light motor vehicle can be raised. Moreover, the permanent magnet generator, in which the polar arcuate angle θ m of the permanent magnet 8 is set to be larger than the polar arcuate angle θ p of the controlling magnetic pole 9, has a physique equal in level to one, in which all of the field poles of the rotor 4 are constituted by the permanent magnets, so that this permanent magnet generator can increase the output greatly as compared with a generator, in which the polar arcuate angle θ m of the permanent magnet 8 is equal to the polar arcuate angle θ p of the controlling magnetic pole 9.

As described above, description has been given of the invention made by the present invention with reference to the embodiment, however, the present invention should not necessarily be limited to the above-described embodiment and it is needless to say that the invention can be modified variously within the scope of not departing from the technical gist.

As has been described hereinabove, according to the present invention, the range of the rate occupied by the polar arcuate angle θ m of the permanent magnet to the sum of the polar arcuate angle θ m of the permanent magnet and the polar arcuate angle θ p of the controlling magnetic pole is set between 0.55 and 0.7, so that the permanent magnet generator according to the present invention can increase the output greatly as compared with one, in which the polar arcuate angle of the permanent magnet is equal to the polar arcuate angle of the controlling magnetic pole and having a physique equal in level to one in which all of the field magnetic poles are constituted by the permanent magnets.

What is claimed is:

1. A permanent magnet electric generator comprising:

a stator having a plurality of stator poles wound with armature coils and having a central axis and one axial side, a rotor supported for rotation relative to said stator about said central axis and carrying permanent magnets arranged at intervals in a direction circumferential to said central axis and arranged concentrically of said central axis on a yoke formed of a magnetic material, said yoke having a cylindrical rim portion radially outwardly surrounding said magnets and a bottom portion located outboard of said one axial side of said stator and between said central axis and said rim portion, said generator being constructed such that electricity is generated in the armature coils by the rotation of said rotor in relation to said stator, said rotor including controlling magnetic poles formed of magnetic material interposed between said permanent magnets of said rotor, said permanent magnets forming same magnetic poles cooperating with said stator poles, a field controlling coil, and means supporting said field controlling coil in a fixed position relative to said stator and in a space formed between said stator and said bottom portion of said yoke such that magnetic fluxes generated by the passage of current through said field controlling coil form closed magnetic circuits passing through said yoke of said rotor and said controlling magnetic poles and also passing through those stator poles aligned with said controlling magnetic poles in superposition with fluxes generated by said permanent magnets, the polar arcuate angle θ m of said permanent magnets and the polar arcuate angle θ p of said controlling magnetic poles being set at values different from each other, with said polar arcuate angle θ m of said permanent magnets being larger than said polar arcuate angle θ p of said controlling magnetic poles.

2. A permanent magnet generator as set forth in claim 1, wherein:

the value θ m/(θ m+θ p) has a lower limit of 0.55, said value θ m/(θ m+θ p) being the polar arcuate angle θ m of said permanent magnets divided by the sum θ m+θ p consisting of the polar arcuate angle θ m of said permanent magnets plus the polar arcuate angle θ p of said controlling magnetic poles.

3. A permanent magnet generator as set forth in claim 1, wherein:

the value θ m/(θ m+θ p) has an upper limit of 0.7, said value θ m/(θ m+θ p) being the polar arcuate angle θ m of said permanent magnets divided by the sum θ m+θ p consisting of the polar arcuate angle θ m of said permanent magnets plus the polar arcuate angle θ p of said controlling magnetic poles.

4. A permanent magnet generator as set forth in claim 1, wherein:

the value θ m/(θ m+θ p) has a lower limit at which the output exceeds by 20% the output of said generator during idle rotation when the polar arcuate angle θ m of said permanent magnets and the polar arcuate angle θ p of said controlling magnetic poles are equal to each other, said value θ m/(θ m+θ p) being the polar arcuate angle θ m of said permanent magnets divided by the sum θ m+θ p consisting of the polar arcuate angle θ m of said permanent magnets plus the polar arcuate angle θ p of said controlling magnetic poles.

5. A permanent magnet generator as set forth in claim 4, wherein:

said rotor is adapted to be driven by a given engine having a rated speed, and the value θ m/(θ m+θ p) has an upper limit at which the output is equal to the output of said generator which is obtained when said rotor is driven by said engine at said rated speed and when said value θ m/(θ m+θ p) is set at said lower limit.

6. A permanent magnet generator as set forth in claim 1, wherein:

the value θ m/(θ m+θ p) is set at $0.55 \leq \theta m/(\theta m+\theta p) \leq 0.7$, said value θ m/(θ m+θ p) being the polar arcuate angle θ m of said permanent magnets divided by the sum θ m+θ p consisting of the polar arcuate angle θ m of said permanent magnets plus the polar arcuate angle θ p of said controlling magnetic poles.

* * * * *